United States Patent [19]

Dumbeck

[11] 4,153,047
[45] May 8, 1979

[54] HEAT STORAGE SYSTEMS

[76] Inventor: Robert F. Dumbeck, 104 Anderson Dr., Elgin, Tex. 78621

[21] Appl. No.: 815,550

[22] Filed: Jul. 13, 1977

[51] Int. Cl.² .............................................. F24H 7/04
[52] U.S. Cl. ................................. 126/400; 126/270; 126/271
[58] Field of Search .................... 252/70, 383, 384; 427/215; 126/270, 271, 400; 165/104 S

[56] References Cited

U.S. PATENT DOCUMENTS

| 2,955,956 | 10/1960 | Baugh et al. | 427/215 |
| 3,600,326 | 8/1971 | Wilcox et al. | 252/383 |
| 3,963,627 | 6/1976 | Cottrell | 428/405 |
| 3,997,001 | 12/1976 | Chubb | 126/400 |
| 4,033,130 | 7/1977 | Hermans | 165/104 S |
| 4,037,579 | 7/1977 | Chubb | 126/400 |

Primary Examiner—John J. Camby
Assistant Examiner—Larry I. Schwartz
Attorney, Agent, or Firm—Laurence R. Brown

[57] ABSTRACT

The present invention provides systems for transfer of heat such as useful in solar energy systems. A heat storage medium is used, preferably salt conditioned by anti-caking anti-corrosive treatment whereby hydrated salts have increased utility by remaining granular during severe temperature and humidity changes, permitting the salt to be used more effectively as a heat storage and exchange medium. The heat storage medium is coated with a heat transfer liquid preferably silicone oil which functions to preserve salt, prevent rust and corrosion therefrom, and to serve as an efficient heat transfer medium between the heat storage medium and transfer means such as heat coils. A solar heat system comprises a solar energy concentrator, a heat input system to a granular particle storage medium, and a heat output system extracting heat from the storage medium.

25 Claims, 2 Drawing Figures

HEAT STORAGE SYSTEMS

FIELD OF THE INVENTION

The present invention relates to heat storage systems and methods of heat storage and transfer.

BACKGROUND OF THE INVENTION

In heat storage systems it is a requirement to take heat from one source, transfer it to a storage medium and then derive the heat when required from storage. Poor efficiency in energy storage and transfer has caused many systems to be marginal in performance or inoperative. Some of the most pronounced deficiencies are in the nature of the storage medium and the transfer mechanism for getting heat in or out of the storage medium. Wherever a media interface occurs or a system interface there is a boundary matching problem to overcome. Thus, for example, transfer of heat from a liquid such as hot water to a gas such as air produces an interface where the amount of heat transfer is critical to the heating efficiency of the two systems or in the ultimate media.

Similarly efficiency and transfer problems exist in the storage of heat. Hot water may be used as storage medium, but it is temperature limited since it becomes steam at boiling temperature. Solids with good heat retention characteristics can be used as storage media. Salts such as common sodium chloride table salt thus might be used.

One serious problem that is often met in handling hydrated salt products is the tendency of the salt particles to cake or bind together. This is often troublesome in bulk storage or in barrelled products but is most serious in those cases where salt crystals are disposed in packages or in systems where a humid gaseous stream flows through the particles. The difficulty is particularly serious in changing both the physical surface area afforded by granules and the physical relationship of the salt with water.

Remedies to prevent caking have met with little success in the prior art, perhaps because of restrictions of the nature of impurities that may be involved. For example, table salt has been dusted with magnesia or tricalcium phosphate to prevent caking. Also, flake grade calcium chloride has been dusted with anahydrous calcium chloride in an attempt to prevent caking, all with limited success.

Also, caking has been partly prevented by dusting the crystals with powdery material by prior art methods, again with limited results.

Another serious problem with such salt products is their corrosiveness. They will tend to rust or pit metals and cannot be stored in or used around steel or iron in particular.

Whenever salts take on moisture and go into solution the corrosiveness spreads, creeps and contaminates surrounding areas.

These properties have limited use and storage of the salt products in favor of substitute materials when available.

Other solid heat storage materials such as stones or sand present interface problems and tend to settle or pack. The ability to effectively use available heat by appropriate transfer into the heat media is limited not only by the material heat storage properties but the nature of the heat transfer interface. Thus with stones or other granular particles packed together in a storage container the amount of surface presented to the transfer medium is critical as well as the nature of the particle-to-particle contact if that be the transfer medium.

By very nature the retention of heat in a storage medium detracts from its physical properties in efficiently receiving and giving up the stored heat. Thus, in heat system construction it has been difficult to provide both high capacity heat storage capabilities and high efficiency operation in transfer of heat into and out of the storage medium. This problem is particularly accentuated when low cost heat storage materials are dictated in a system, such as sand or salt.

It has now been found that by practice of the present invention, many difficulties and disadvantages of prior art attempts to produce efficient heat storage and transfer systems have been overcome in a simple highly efficient manner.

SUMMARY OF THE INVENTION

The present invention, generally stated, provides improved methods and systems for heat storage and transfer by means of specialty processing of selected materials and providing efficient heat transfer interfacing. Thus, granular materials such as sand or salt are stored for example in 55 gallon drums as a heat storage medium providing a large surface area and excellent heat storage characteristics. The materails are wetted by a liquid, preferably silicone oil, to provide efficient heat transfer interfacing into, out of and between the heat storage materials.

In a typical embodiment of the invention, solar heat is transferred at high temperatures in the order of at least 150° C. (above water boiling temperature) by an appropriate lens into a circulating piped system of preferably silicone oil heat transfer media which enters the storage drum for heating the storage materials by heat transfer thereinto. Retained heat is then transferred to a heat user such as a home heating system by a similar circulating piped system which derives heat stored in the materials. By wetting the storage materials more stroage capacity heat transfer efficiency is attained both into and out of storage. If granular salt is used as a preferred heat storage medium then the wetting serves to inhibit corrosion and prevent caking from humidity or moisture. If sand, another preferred heat storage medium, is used, it is prevented from packing and is retained in good physical contact with heat exchangers by the wetting agent.

OBJECTS OF THE INVENTION

A general object of the invention is to provide improved heat storage systems resolving one or more deficiencies of the prior art such as those aforesaid.

Another object is to use effectively granular materials in heat storage systems.

Yet another object is to produce more efficient transfer of heat between system interfaces.

It is one object of the present invention to provide new anti-caking salt compositions.

It is also an object of this invention to provide a simple, efficient and practical method for preparation of salt particles which resist caking by being encased in a protective fluid film.

It is also an object of this invention to provide anti-caking salt particles for utilities where prior usage has been restricted because of particle caking.

One specific object of this invention is to use salt paticles as a heat storage and transfer medium.

Another specific object of this invention is to process salt particles so that they may be stored for example in steel drums without inducing corrosion thereof.

THE DRAWING

These and other objects and advantages will become more apparent from the following more detailed description of preferred embodiments of the present invention, and the accompanying drawing, wherein...

FIG. 1 is a schematic diagram of a heat transfer system embodying the invention, and FIG. 2 is a schematic diagram of a solar heat system embodying the invention.

DETAILED DESCRIPTION OF THE INVENTION

Figure 1:
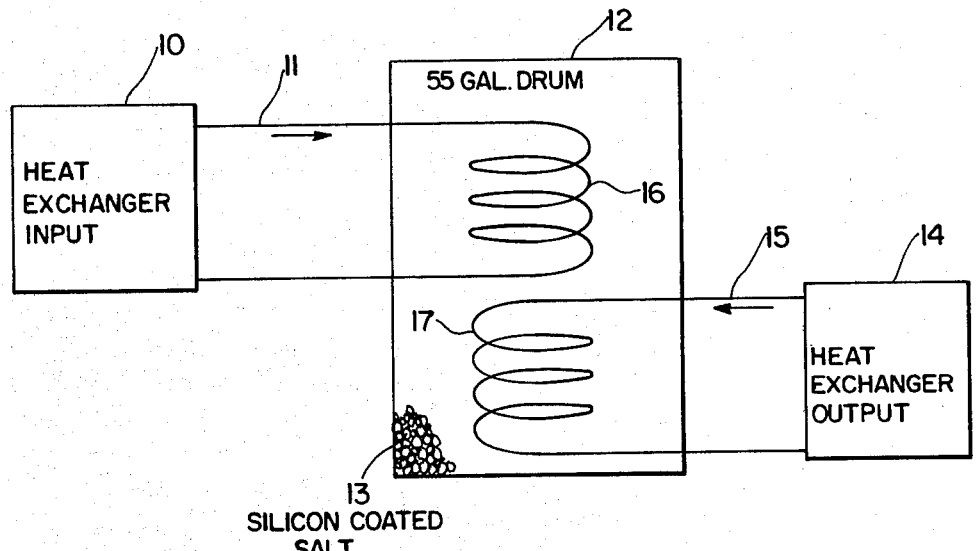

The environment for the material combinations proposed by this invention and the heat storage system aspects of the invention are referenced to the drawing, where FIG. 1 is a general heat transfer system environment. Thus, an input heat exchange unit 10, which might be a furnace, solar system, heat pump, etc., provides in the piping 11 carrying a circulating heat exchange medium at a temperature entering 55 gallon (208 liter) steel drum 12 higher than that attained by the granular storage materials 13 within the drum. Note that heat transfer is reversible and as a cooling system, the heat input system 10 could be a well or refrigerator unit.

Output heat from the storage system is directed to external heat exchanger unit 14 by a similar piping system 15. Inside the drum 12 are heat exchanger surfaces represented by coils, 16, 17 respectively.

In the use of this system critical factors are (a) the physical characteristics of the storage medium and (b) the efficiency of transfer of heat into and out of the storage medium.

In the former respect, the preferred storage material embodiment is one that has the following set of properties:

1. Holds high quantities of latent heat in a form that can be entered and withdrawn easily.
2. Inexpensive.
3. Non-corrosive.
4. Non-deteriorable.
5. Easy to handle.
6. Adaptable to size and shape.
7. Keep size and shape over life.
8. Small in volume relative to heat storage capacilities.
9. Provide large effective surface contact areas for interfacing.

In order to comply with these material properties, granular substances are preferred. Sand, for example, can be efficient in volume and meets most of the above criteria. It, however, does not easily respond to the efficient transfer to heat in and out because it is difficult to reach and transfer heat to all the salt particles quickly. Also, it tends to deteriorate by packing and reducing effective surface areas.

Ordinary NaCl rock or table salt is a preferable material for heat storage capability. However, it is difficult to handle, will tend to corrode metals and particularly iron, and will deteriorate in the presence of humidity and moisture. Glauber's salt has some of these same advantages and disadvantages.

Relevant to the second above criterion, namely the efficiency of heat transfer in and out of the medium, the various possible storage materials have differing characteristics. If used in a well known standard container such as a 55 gallon steel drum, the granular materials are easy to handle and give good packing volume and storage potential provided the heat can be transferred into all particles and removed. This is an inefficient operation with an air contact medium for thermal exchange, either used directly or indirectly. Air is a poor heat exchanger. Also if circulated through a granule pile, the variations and effect of humidity is pronounced. It, however, does reach through gaps and covers a large surface area.

It has been found in accordance with this invention that liquid in wetted contact with granules is a preferred thermal exchange medium that efficiently and effectively reaches most granules over very large total surface area for transfer in and out of heat.

It has also been found in accordance with this invention that silicone oil is a preferred liquid, because of a combination of features. It is non-corrosive. It is an excellent heat transfer medium. It creeps and covers uniformly all exposed surfaces. Thus, one or two quarts (0.95 or 1.9 liters) of silicone oil can be put into a 55 gallon drum either before or after filling with a granular material, preferably sand or salt, and then it will creep to surface cover all granules and the inside metal surfaces and even creep out cracks in the lid, etc. if not hermetically sealed. This provides a thin protective covering for steel preventing corrosion, and for salt as described herein in other places.

By this means all the foregoing desired criteria are realized by inexpensive, common materials to effectively and efficiently improve heat storage systems at the most critical prior art areas of deficiency. It is clear that the silicone wetted coils 16, 17 effectively exchange heat into and out of storage drum 12 which has very high storage capacity for long periods at very high temperatures above the boiling temperature (100° C.) of water.

Figure 2:
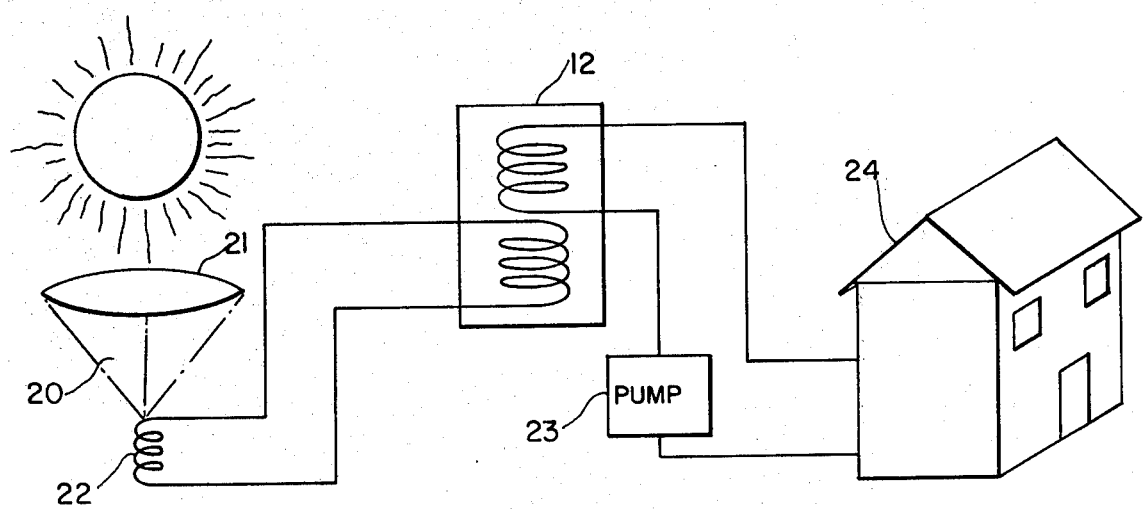

A practical solar system using these characteristics is shown in FIG. 2. Thus, the sun's rays 20 are focussed by lens 21 onto a heat exchange unit shown as coils 22 through which is circulated silicon oil as a heat transfer medium. Thus, the temperature of circulating fluid may, for example, conveniently be in the order of more than 150° C., whereas water would turn to steam.

The heat storage medium container 12 is physically above the coils 22 to provide a thermal syphon effect. Thus as long as the coil 22 temperature is higher than that stored in drum 12, the liquid will rise and circulate with the liquid cooled off by heat transfer into the storage medium then falling and returning to the solar heat source. The heat is stored until demand, effected by starting pump 23, which withdraws stored heat for heating house 24, for example.

Therefore, the combination of the use of the various features provides a heat storage and transfer system with considerable advantage in materials, cost, efficiency, low maintenance and low operating costs. Furthermore, an improved and synergistic effect results in the combination of the various features of use of granular materials, with high heat storage capabilities, wetted by a liquid and in an efficient heat exchange relationship with thermal sources by means of the wetting medium. Added low life maintenance is achieved, low heat pumping costs into the storage medium, simple and inexpensive materials and systems components, etc.

The silicon coating uniformly covers all exposed granular surfaces, stays uniformly wet and does not drain off granular materials and need only comprise about 1% of the volume of the container with granular materials, i.e., one to two quarts of silicone oil per 55 gallon drum of sand or salt.

Other examples and embodiments are found in the following description.

Practice of the present invention provides an effective means by which to limit caking of salt particles and corrosive properties thereof, thereby to extend the usage of such particles to areas where prior attempted usage was impractical.

Generally, salt particles are rendered anti-caking by being exposed to liquid coating, preferably silicon solutions which form a thin moisture protection film adhering uniformly about the particles. Although not intending to be bound by explanation of the theory of how anti-caking is achieved by the present method, it appears that the silicone renders the salt particles impermeable to water either by containing the water of hydration or by restricting moisture from the surroundings from gaining access to the encased particles. The film also appears to contain the corrosive salt solutions in place without spreading so that for example sodium chloride can be stored in steel drums without corrosion.

The salt particles which may be coated by a liquid oil or silicone solution using the practice of the present invention may be of different chemical constituencies and typically may be salts such as sodium chloride generally which have a tendency to cake and corrode. More specifically, the salts which are hydrated and tend to increase or decrease in hydrated value in the presence of ambient atmosphere over temperature and humidity changes are effectively rendered anti-caking by practice of the present invention. Some examples of salt particles which may be encased in a coating of silicone include, without limitation, and in general the alkali metal chlorides, sulfides, sulfates and nitrates. Glauber's salt ($Na_2So_4 10H_2O$), sodium cloride, calcium chloride and the like are preferred examples.

Coating of the salt particles may be effected by any of a number of available methods such as spraying, pan coating, suspension-in-air coating, gravity coating, or the like.

Spraying may be effected simply by directing an atomized mist directly onto the salt particles.

Pan coating may be effected by coating the salt particles by immersing into the silicone while tumbling in a pan.

Suspension-in-air coating may be effected by floating the salt particles in a stream of air and coating the particles by spraying the silicone onto the particles.

Gravity coating may be effected by simply permitting the silicone to be poured over the salt particles with coating being accomplished by gravity as the silicone flows from downwardly between the particles.

One useful device for effecting coating of the salt particles, by way of example, is that disclosed in U.S. Pat. No. 2,955,956.

It has been found that oil and silicone solutions tend to spread over the surface of salt particles or granules, whether of regular or irregular shape, and form a thin film. Thus, in the coating processes above mentioned the tumbling and spraying is for providing access to the silicone solution to all particles rather than the lengthy process of providing the solution to all exposed surface areas which would require greater care in spraying or tumbling.

Silicone solutions of various types may be used to coat the salt particles by practice of the present invention and such are commercially available in the art. One suitable silicone composition is a blend of about 70 to 98 percent by weight petroleum oil carrier having a viscosity of about 20 to 300 SSU at 50° C., and from about 2 to 30 percent by weight of silicone. The amount of the organosiloxane copolymer in the mixture need only be sufficient to effect the desired coating of the salt particles. Hence, although a range up to 30 percent by weight is suitable, a range of from about 2 to about 10 percent by weight is typically effective and is accordingly preferred.

Silicones as used herein may include organosiloxane prepared by the method set forth in detail in U.S. Pat. No. 2,676,182, which is incorporated herein by reference. The organosiloxane copolymer is typically formed of $(CH_3)_3SiO_{0.5}$ units coupled with $SiO_2$ units in a corresponding ratio of about 0.65/1 to 1.2/1 respectively, and in which the silicone-bonded hydroxyl content is at least 0.8 weight percent based on the weight of the organosiloxane copolymer.

The amount of silicone-oil mixture used to coat the salt particles may vary and need be sufficient only to provide a silicone coating to enrobe the particles. When excess amounts of silicone-oil mixture are used, the excess will normally accumulate as residue or will serve to coat any new particles which may be added or those which remain uncoated, and may even be useful in creeping over exposed surfaces of steel drum containers or the like to provide thereon a protective film as well, which even further limits the corrosion effected by proximity to salt.

The following examples illustrate practice of the present invention in greater detail. In the examples, as well as in the specification generally, all parts are given by weight unless indicated otherwise.

EXAMPLE 1

100 parts by weight of Glauber's salt encapsulated by spraying thereon a mixture of silicone-oil onto the particles. One preferred mixture of silicone-oil has about 9 parts by weight mineral oil and 1 part by weight of a copolymer, providing a ratio of 0.65/1 to 1.2/1 of $(CH_3)_3SiO_{0.5}$ units to $SiO_2$ units.

EXAMPLE 2

In a comparison test, 100 parts by weight of Glauber's salt are taken and exposed to the same variations of temperature-moisture conditions. The untreated salt particles cake into a solid mass whereas the particles prepared by the practice of Example 1 remained free flowing.

EXAMPLE 3

Sodium chloride commonly known as rock salt dipped in a solution of fluoro-silicon fluid, commercially available as Dow-Corning No. 551265, and thereafter stored in steel drums exposed to warm humid ambient air for several weeks wherein the salt remains in particle form without caking and without rusting the drums.

EXAMPLE 4

Silicone coated sodium chloride salt particles of various sizes in a storage vat coated with silicone solution were exposed to temperatures higher than 25° C. by passing heated air therethrough until the salt temperature significantly exceeded that of ambient air, and then humid ambient air at about 20° C., without drying, was passed through the storage vat at a volume flow adjusted to increase the air temperature to about 25° C. After operation under such conditions the sodium chloride particles remain discrete, not caked, and provide large surface area to the air resulting in efficient contact areas with corresponding transfer of stored heat to the air. The process may be reversed for cooling air.

EXAMPLE 5

The temperature of the heated air passing through the salt particles exceeds 100° C. to produce substantially the same conditions as Example 4, thereby to provide a process not feasible with unpressurized water. The heat transfer may be made by means of coils passing through the salt where the silicone serves as a wetting agent and heat transfer medium to more effectively store and withdraw heat.

EXAMPLE 6

The salt particles prepared by the procedure of Examples 1 to 3 are contained in a fifty (50) gallon steel drum. Uncoated salt particles are similarly contained and stored over a period of several weeks. The drum containing the coated salt particles of Examples 1 to 3 will show little corrosion compared with the drum containing the uncoated particles. In some cases the protective silicone solution has also coated the drum surface and has even crept over the rims and to an outside surface forming a thin protective film on the drum surface.

EXAMPLE 7

In U.S. Pat. No. 3,254,703, cans of Glauber's salt are disposed in a heat storage bin, the cans being used because of the great tendency of Glauber's salt to cake over temperature-moisture changes. Instead of storing the salt in cans and passing air over the can surfaces, the particles of Glauber's salt coated by the method of Example 1 are disposed directly into a heat storage bin such as that disclosed in U.S. Pat. No. 3,254,703 and ambient humid air is passed through the salt particles. Not only do the coated salt particles resist caking but also they provide a more efficient heat storage and transfer system since air passing through the heat storage bin is channeled through an indefinite number of paths between the salt particles covering a large salt surface area which improves the efficiency of the heat transfer mechanism.

EXAMPLE 8

In another example of improving the utility of coated salt particles by practice of the present invention, a black solar heat collector is covered with a layer of silicone coated salt particles, and exposed to the sun. Heat from the solar collector is transmitted to the salt which serves as a heat storage source, Ambient air is thereafter heated by being blown through the salt particles.

EXAMPLE 9

In yet another example of improving the utility of coated salt particles by practice of the present invention, salt particles coated by the procedure of Examples 1 to 3 are transmitted from one location to another by a conveyor. Preferably the conveyor is a pneumatic tube. Using moist air, the particles are transmitted without any significant degree of caking.

EXAMPLE 10

In a conveyance chute connecting a heating station with a cooling station, salt particles prepared by the procedure of Examples 1 to 3 are transported in either direction to heat or cool respectively. Not only is it found that the coated salt particles effectively store and transmit latent heat but also the transmission is effectively made without any significant degree of caking or salt corrosion to the system.

EXAMPLE 11

Salt particles processed by the procedure of Examples 1 to 3 contained in an open top plastic container in the presence of humid ambient air compared to those in a similar container using the same salt in untreated form. The latter salt particles freely cake whereas the former remain granular.

Thereafter hot and cold ambient air was passed through the salt in the containers to change air temperature. When exposed to identical heating and cooling conditions, the container having the coated particles more effectively transfers stored latent heat than the container having the uncoated salt particles.

EXAMPLE 12

Sodium chloride particles are dipped in a high detergency oil solution to form an oil film over their entire surface area and while said film is in place, ambient humid air is passed through a plurality of said particles in contact with each other without causing caking.

Thus, a protective liquid coating that resists passage of water into the salt is used by this invention to improve granularity and decrease corrosiveness of salt.

EXAMPLE 13

Two quarts of Dow-Corning 200 fluid dimethylpolysiloxane silicon is placed in a 55 gallon steel drum into which is placed heat conduction coils for circulation of a heat transfer medium. The drum is filled with salt which packs around the coils. The silicon creeps about the salt particles and covers them and forms a wetting surface between salt particles and between the coils and the salt for efficient transfer and storage of heat. The salt may be of various grain sizes, but smaller grains present greater surface areas in contact with the heat transfer medium and thus are preferable.

The heat transfer medium circulated in the coils is preferably similar silicone oil, which can be heated by solar methods for example about 100° C. for efficient transfer and storage in the salt granules. This has significant advantage over any water systems which form steam and need be pressurized.

From the foregoing, it will be readily apparent to those skilled in the art that various modifications and changes may be effected without departing from practice of the presently disclosed invention.

It is clear that this invention provides a synergistic combination whether with respect to the system, the particular materials or the heat transfer interfacing. Thus, the silicon coated granules not only prevent caking and erosion but also effect an efficient heat transfer interfacing. The use of the materials permits high storage temperatures and efficient solar energy systems.

Those novel features believed descriptive of the spirit and nature of the invention are defined with particularity in the appended claims.

What is claimed is:

1. A heat storage system comprising in combination,
   a body of granular heat storage particles in adjacent contact with each other adapted to receive and store heat,
   a wetting agent covering the particles with an adhering liquid coating uniformly covering all exposed surfaces with a film that does not drain off,
   and heat transfer means in thermal contact with said wetting agent thereby transferring heat from said storage particles through thermal exchange by contact through said wetting agent to substantially the entire interfacing surface areas of the particles.

2. A system as defined in claim 1, wherein the particles are salt.

3. A system as defined in claim 1, wherein the wetting agent comprises silicone oil.

4. The system defined in claim 1, wherein the particles are stored in a closed container.

5. The system defined in claim 4, wherein the particles are salt, the container is a steel tank and said wetting agent is silicone oil whereby corrosion of the steel tank by salt reaction is eliminated by a surface film of the wetting agent on the inside surface of the steel tank.

6. The system defined in claim 1, where the means transferring heat comprises piping circulating a liquid heat transfer agent into the body.

7. The system defined in claim 6, wherein the liquid heat transfer agent comprises unpressurized silicone whereby temperatures of greater than 100° C. are attainable without change of liquid or piping pressure.

8. The system defined in claim 6 including means heating the heat transfer agent and means disposing the piping below the body to enhance thermal circulation of the liquid in the piping through said body.

9. The system defined in claim 6 including means heating the liquid transfer agent substantially above 100° C.

10. The method of retaining a body of granular particles over long periods of time in a consistent uniform physical relationship without packing, corrosion or deterioration in a heat exchange relationship comprising the steps of,
    storing the particles in contact with each other in a container,
    covering the particles with an adhering liquid coating that uniformly covers all exposed surfaces with a film that does not drain off and thermally exchanging heat stored in said particles by passing a heat transfer medium through the particles to exchange temperature therewith by thermal contact with all the particle surfaces through said liquid coating.

11. The method of claim 10, wherein the container is closed.

12. The method of claim 10, wherein the coating comprises silicone oil.

13. The method defined in claim 12, wherein the particles are coated by placing in a container and placing into the container a quantity of silicone oil in the order of 1% of the volume of the container.

14. The method of claim 10 including the step of storing the coated particles in contact with each other in the presence of humid ambient air.

15. The method of claim 10, wherein the particles are salt.

16. The method of claim 15, wherein the salt particles are hydrated.

17. The method of claim 15, wherein the salt particles are sodium chloride.

18. The method of claim 15, wherein the salt particles are Glauber's salt.

19. The method of claim 15, wherein the salt particles are in steel containers.

20. The method of claim 15, wherein the salt is transported from one location at a predetermined temperature to a second location of a different temperature.

21. The method of claim 20, wherein the container is the transportation means.

22. The method defined in claim 10, wherein the heat transfer medium comprises silicone oil.

23. The method defined in claim 10, wherein the medium is passed through coils immersed in the particles, and wherein said film wets the particles to efficiently transfer heat between the particles and the heat transfer medium.

24. The method defined in claim 22 including the step of heating the transfer medium to a temperature exceeding 100° C.

25. The method defined in claim 10 including the step of circulating the heat transfer medium through piping into thermal contact with said particles, heating the heat transfer medium above the temperature of the particles and locating the particles above the heating location to enhance thermal circulation of said heat transfer medium in said piping.

* * * * *